Patented Jan. 7, 1941

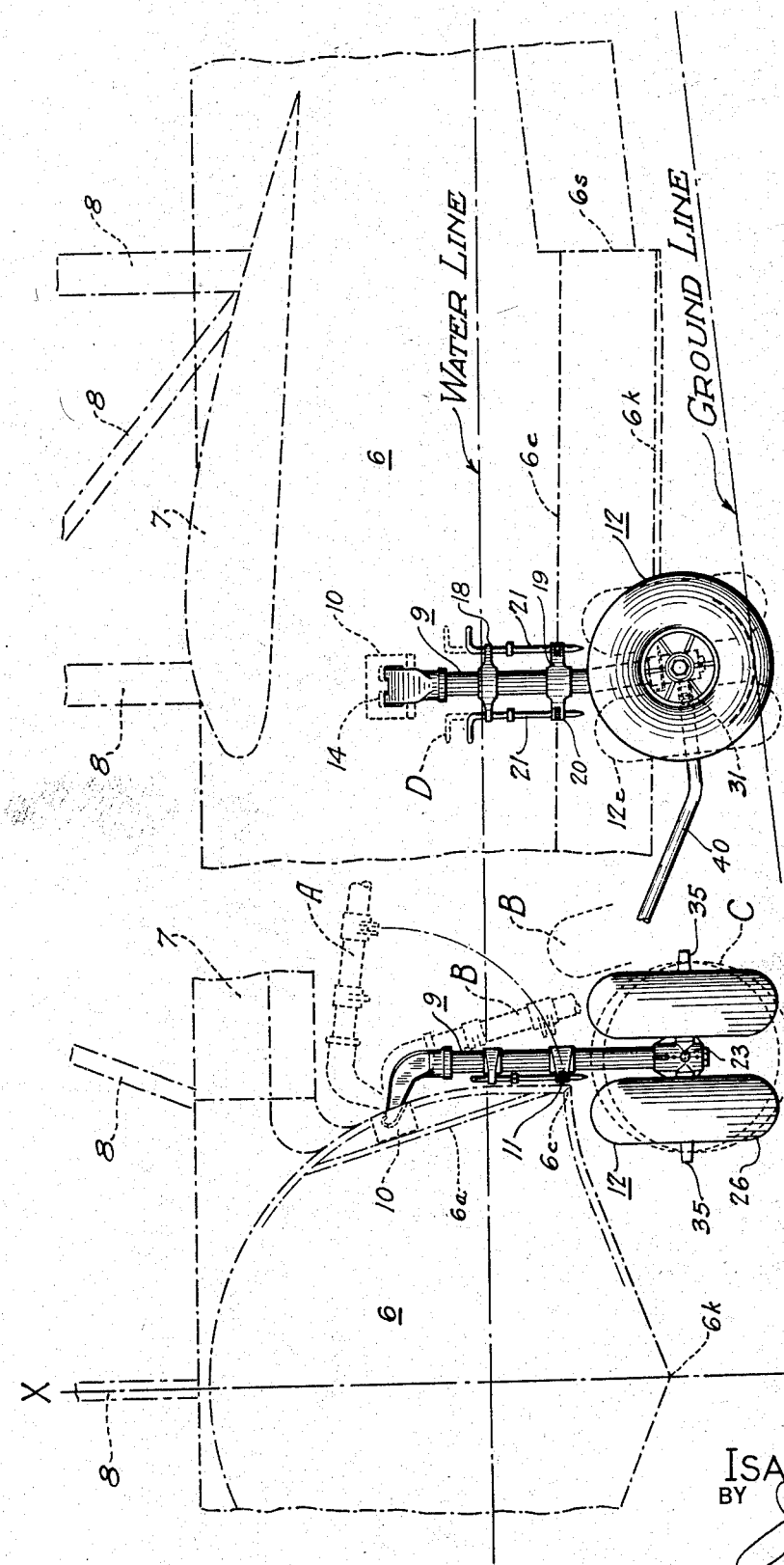

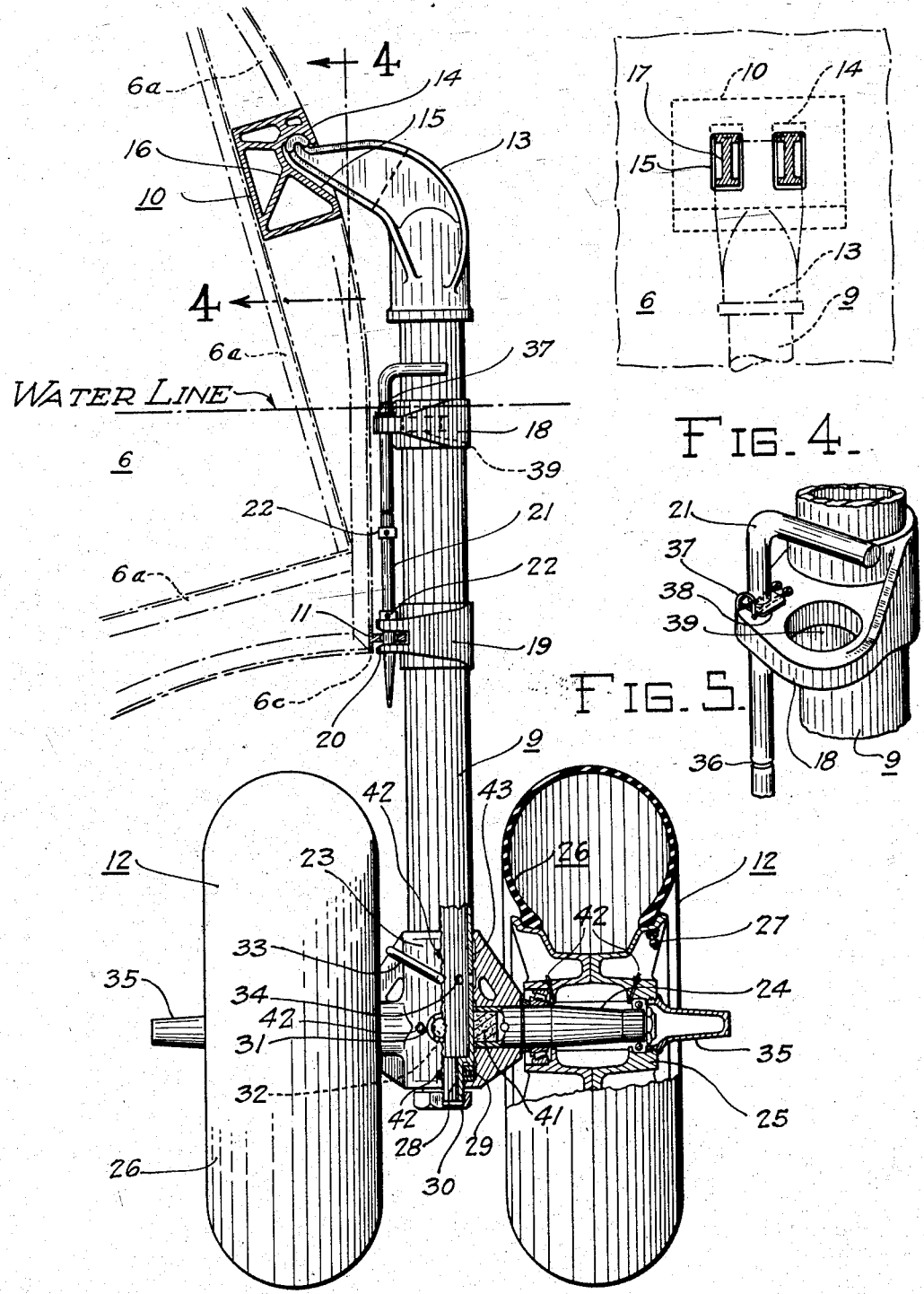

2,227,725

UNITED STATES PATENT OFFICE 2,227,725

AIRCRAFT HANDLING GEAR

Isaac M. Laddon, Buffalo, N. Y., assignor to Consolidated Aircraft Corporation, a corporation of Delaware Application June 26, 1935, Serial No. 28,445

11 Claims. (Cl. 244—1)

This invention relates to handling gear for aircraft and more particularly to swivelling beaching gear for aircraft of the flying boat or seaplane type.

Various forms of gear for handling or wheeling aircraft from floating positions on the water to shore positions and vice versa have been proposed. The majority of these devices have been cumbersome, heavy and difficult to attach and detach from the boat hull, particularly when the surface of the water is choppy or rough as is frequently the case at beaches, ramps and similar areas. They furthermore do not readily permit lateral or turning movements of the craft while supported on such gear either in the water or ashore.

My invention obviates the difficulties met with in the use of such devices by providing a beaching gear comprising a comparatively light but strong assembly, readily attached or detached due to its having corrected buoyancy and simple self-alining attachment fittings, and being further provided with two swivelling and steerable wheels.

It is an object of my invention to provide a simple, compact and light, but sturdy, beaching gear. It is also an object to provide a gear which may be easily attached or removed from the boat hull by means of simple self-alining fittings which are readily accessible at all times. It is also an object to further simplify the attachment or detachment of the assembly by providing it with a means whereby the normally submerged portion of the assembly will displace a volume of water substantially equal to its own weight, thereby permitting its movement beneath the water without either excess weight or buoyancy. It is a further object to utilize the pneumatic tires of the wheels to both support the load of the craft and to serve as the means for controlling the buoyancy of the assembly. It is a further object to provide the said tires with a special valve which will permit the injection or removal of either air or water.

A further object of my invention resides in the provision of a beaching gear which can either be attached to the boat hull when afloat either from a substantially horizontal position above the surface of the water or from a substantially vertical position below the surface of the water. It is also an object to provide a beaching gear with pneumatic-tired wheels normally rotatable about their horizontal axles only, but also swivelling or full castering when desired about the vertical axis of their supporting strut. A further object resides in the provision of means whereby leverage is obtained for the manual turning or steering of the swivelling wheels, the same means also serving as an attachment point to facilitate towing of the aircraft.

Other objects will be apparent from a reading of the subjoined description and claims and from the consideration of the accompanying drawings forming a part of this specification, and in which like numerals are employed to designate corresponding parts in all their views.

Fig. 1 shows a partial elevation of a flying boat to which a preferred embodiment of my invention is shown to be adapted;

Fig. 2 shows a partial front elevation of the same;

Fig. 3 shows an enlarged detail view with portions broken away of the beaching gear assembly shown in Fig. 2;

Fig. 4 is a sectional view of the upper attachment and boat hull fitting taken along the lines 4—4 of Fig. 3; and Fig. 5 is an enlarged perspective detail of the means for guiding and locking the pin for the lower attachment fitting.

With further reference to Fig. 1, the numeral 6 indicates a portion of a typical flying boat hull, its keel being indicated at 6k, its chine at 6c and a step at 6s. The wing is indicated at 7 and the struts and diagonal bracing are diagrammatically indicated at 8. At a position substantially beneath or slightly forward of the center of gravity of the aircraft I have shown a preferred embodiment of my beaching gear device as indicated at 9, it being understood that the boat hull is substantially symmetrical about the vertical central axis X—X of Fig. 2 and that a like device may be associated with the opposite side of the hull to operate in the manner hereinafter described.

The beaching gear assembly 9 comprises essentially a substantially vertical strut, preferably of tubular construction, provided at its upper end with a forked fitting 13 for attachment to the hull fitting 10, and provided at its lower portion with two pneumatic-tired wheels 12 and at an intermediate position with fittings 20 for attachment to the lower fittings 11 at the chine 6c of the hull. The upper hull fitting 10 is shown positioned with its outer surface flush with the covering of the boat hull at a location above the water line and beneath the leading edge portion of the wing 7. The fitting 10 is rigidly bolted to the hull framing members indicated at 6a, the connection being such that each such fitting will transmit its proportional share of the total weight of the flying boat with a suitable factor of safety to allow for jarring, impact, etc. The chine fittings 11 are positioned beneath the water line when the craft is fully loaded and each is adapted to maintain the strut 9 of the assembly in a vertical position by means of the locking pins 21 and is not designed to carry any vertical reaction from the weight of the craft when the wheels bear upon the ground.

Referring now to the more detailed showing in Fig. 3, the vertical strut 9 has fixed to its upper end the bifurcated or forked fitting 13 which is provided with arcuate nosed extensions having rounded portions upwardly extended and adapted to bear against the concave surfaces 14 within the hull fitting 10. The fitting 13 may be bolted, pinned, threaded or otherwise fixedly attached to the upper end of the vertical strut 9 to prevent any axial or longitudinal movement with respect thereto when the weight of the aircraft is transmitted from the hull fitting 10 to the ground through the fitting 13, the strut 9 and the wheels 12. The forked extensions of the upper attachment fitting 13 are substantially I-shaped in cross-section as more clearly indicated in Fig. 4.

At a position substantially at the loaded water line of the craft a fitting 18, having a central opening adapted to fit closely about the strut 9 and two smaller openings in its laterally extending ears, is securely fastened to the strut 9 and serves as a guide for the upper portion of the locking pins 21. This fitting may also have an opening 39 which may be utilized for the fastening of a line or cable for towing or mooring the craft, lifting the handling gear or for other purposes. A similar fitting 19 is attached to the strut 9 at a point opposite the chine 6c of the hull and also has two laterally extending ears provided with openings which aline axially with the openings in the upper fitting 18. The ear portions of the fitting 19 extend fore and aft, or parallel with respect to the hull side and have bifurcated portions 20 to receive the apertured tongues of the chine fittings 11.

The lower portion of the strut 9 is bent to extend rearwardly as shown in Fig. 1 such that the lower extended axis of the strut meets the ground line perpendicularly to permit proper swiveling of the wheels 12 about an axis normal to the plane of the ground. In this figure the ground line is indicated with respect to the deflected shape of the loaded tire, the full line indication of the tires being their unloaded or suspended shape and the dotted outlines 12c represent one of the swiveling or castering positions.

The lower end of the strut 9 is provided with a portion 28 which is of smaller diameter than the main portion and is threaded at its lower end. This reduced portion forms a shoulder which bears against a thrust bearing 29 positioned between the said shoulder and the upper face of a lip portion of a socket fitting 23, so that all vertical loads imposed upon the strut 9 will be transmitted to the socket 23 by the thrust bearing 29 thereby permitting rotation of the socket about the strut 9 which is journalled in its upper portion. The socket fitting 23 is provided with two laterally extending openings within which are suitably pinned or fastened the axles 24 about which the hubs 25 of the wheels 12 are adapted to rotate upon their bearings. The construction and details of wheel bearings of this type are well known and do not comprise a novel part of this invention. The inner ends of the axles are tubular and are adapted to house wicks 41 containing graphite, grease or other material for the proper lubrication of the adjoining bearing surfaces between the strut 9 and the socket 23.

The upward movement of the strut 9 away from the thrust bearing 29 is prevented by the lock nut 30 which is threaded upon the lower end of the reduced portion 28 of the strut. The socket fitting 23 is substantially in the form of a cross having suitable stiffening webs extending in a vertical plane from its laterally extended axle portions inwardly toward its main cylindrical portion which is adapted to rotate about the tube 9. A laterally extending projection pin 31 is rigidly fastened to the cylindrical portion of the socket fitting 23 at about the plane of the extended axes of the wheels 12 and extends substantially at right angles thereto. This pin 31 is adapted to have fitted thereover the tubular steering dolly or bar 40 which is indicated partially in Fig. 1. The pin 31 is further provided with an opening 32 which is adapted to receive such a dolly or a shackle for attaching a cable for towing or anchoring purposes.

Radial holes 34 are provided near the upward portion of the socket fitting 23. These holes pass through both the fitting 23 and the strut 9 and when in alined relationship are adapted to have inserted therethrough the locking pin 33 which is adapted to prevent rotation of the socket member 23 about the strut 9. While there are but two of these alined holes in the fitting 23, there are a plurality of diametrically positioned holes 34 through the wall of the tube 9 such that the fitting and its associated wheels may be positioned and locked in any one of a number of positions about the strut 9 as an axis.

The wheels 12 are each provided with handling members 35 which also serve the combined purpose of waterproof dust caps and steps. The wheels are also provided with rubber tires 26 which are adapted to be inflated through the special valve 27. This valve is provided with an outer portion very much like the air valve in common use on pneumatic automobile and aircraft tires, but when removed, its inner portion provides a comparatively large opening through which water may be injected or removed from within the tire. By the use of this valve the weight of the beaching gear assembly can be adjusted within considerable limits determined by the amount of water injected within the tire. Beaching gears provided with tires which are inflated only with air often displace so much water and are so comparatively light with respect to the water displaced that their buoyancy is excessive and it is with great difficulty that they are forced to the desired positions beneath the surface of the water. These conditions are considerably aggravated when the water is either choppy or rough. By injecting water within the tire, the weight of the handling gear can be adjusted so that it can be readily submerged and positioned.

The hull attachment fitting 10 is substantially rectangular in outline and is provided with two openings 15 open to the exterior, and internally stiffened by the ribs 16. The openings are each provided at their upper portions with a concave surface or shape which is complementary to the nose portion 14 of the upper fitting 13. The back of the openings 15 in the attachment fitting 10 are shaped similarly to the opposed lower surfaces of the forks of the fitting 13 and is spaced therefrom, as shown at 15 in Fig. 3, a sufficient distance to permit the nose portion to be readily inserted within the hull fitting. The opening within the hull fitting 10 is open on its external side only, there being no opening extending through the fitting from the exterior to the interior of the hull 6. The openings at the outer surface of the hull are substantially rectangular and are each slightly wider than the two nose portions 14 of the forked fitting 13. They are spaced apart to permit the two members of the fork each to engage centrally therewith and when in such engagement the lower end of the assembly is permitted to drop downwardly and rotate about the center of the nose surface 14 as an axis within a plane in which the openings in the fittings 18 and 19 will be caused to aline with the corresponding openings in the chine fitting 11, thereby facilitating the positioning of the locking mechanism of the handling gear which would invariably be beneath the surface of the water and invisible to the operator. When the openings in the fittings 18 and 19 and those in the chine fittings 11 are alined, the locking pins 21 are inserted and the assembly is prevented either from falling away from its upper attachment, or from outward and upward rotation about the same.

The locking pins 21 are provided with two annular grooves 36, the lower groove being so positioned that when the pin is in the open or unlocked position indicated by D in Fig. 1, the wire spring member 37 attached to the upper surface of the fitting 18 and guided by the plate member 38 is adapted to engage the annular groove and hold the pin in position. A similar groove is provided near the bent handle portion of the locking pin 21 at a point where the spring 37 will engage it and hold the pin in its lower or locked position, as shown in Fig. 5. Each spring is provided with an outer or looped end at which pressure of the fingers will cause sufficient deflection to release it from the opposite sides of the groove 36 of the pin. Suitable collars 22 are provided on that portion of the pin between the fittings 18 and 19 to prevent the accidental removal of the pin from these fittings.

In operation, when it is desired to beach the flying boat, the upper attachment fitting 13 of the handling gear is inserted into the hull fitting 10 either from a substantially horizontal position as indicated by the dotted lines at A in Fig. 2, or from the nearly vertical position indicated by the dotted lines B of the same figure depending upon which is more suitable under the particular conditions prevailing at the time. The locking pins 21 being held in their upper unlocked positions by the springs 37, and as would be indicated by the dotted lines at D in Fig. 1, the gear is pushed or permitted to drop downwardly until the openings in the chine fittings 11 aline with the openings in the fittings 19 when slight pressure upon the springs 37, which would now be positioned substantially at the water line, causes the releasement and the falling of the pins 21 and the automatic locking of the assembly to the hull. In maneuvering the craft while supported upon the handling gear either in the water or ashore, the wheels 12 may be made to swivel about the axis of the strut 9 by the removal of the pin 33 from the holes 34 in the socket 23 and the strut 9. Should it then be desired to maneuver the craft by steering the wheels of the handling assembly, the steering or dolly bar 40 may be slipped over the projection 31 and the necessary leverage or purchase obtained in order to turn the wheels in the desired direction.

A plurality of fittings 42 are provided in the cylindrical wall portion of the hub fitting 23 and connect with the annular channels 43 through which the bearing surfaces of the tube 9 and the thrust bearing 29 are lubricated. The wheel axles and bearings are similarly lubricated through the fittings 42 provided in the wheel hub. In actual practice it has been found advantageous to thoroughly grease or lubricate all such bearing surfaces by means of a grease gun or other pressure lubricating device after each immersion, thereby driving out all water which may have seeped therein, and the procedure is particularly desirable when the gear is used in salt water in order to retard or eliminate its corrosive and other deleterious effects.

It is understood that the drawings and the above description are for purposes of illustration only, and various changes and modifications which may occur to one skilled in the art are to be considered within the scope and spirit of this invention.

What I claim is:

1. In a handling gear adapted for attachment to a flying boat hull, a unitary strut member having a reduced lower end portion, an axle-carrying socket member having an axial opening and a shoulder adjacent its lower portion extending thereinto, a thrust bearing adapted to fit within said axial opening, against said shoulder and about said end portion such that the said members are adapted to rotate with respect to each other and axial compression is transmitted through the said thrust bearing, the said end portion being threaded, a locknut engaging said threads such that axial movement of the said members is restricted, wheels rotatably mounted upon axles of said socket member such that said wheels are adapted to swivel about the axis of said strut member and rotate about an axis normal thereto, openings in said members, and a pin adapted to engage the said openings to control the swivelling of the said wheels.

2. In a beaching gear for aircraft, a single substantially upright member adapted to assume compressive loads, a socket fitting associated with an upper terminal of the said member adapted for load carrying engagement with an aircraft body, ground engaging elements swivelly and rotatably mounted upon the lower terminal of the said member, and a latching mechanism associated with the intermediate portion of the said member, the said latching mechanism comprising apertured elements adapted to align with similar apertured elements associated with the aircraft body below the normal water-line of the same, and pins adapted to engage the said aligned elements, the said pins extending to positions above the said water-line.

3. In a detachable handling gear of the type described for an aircraft adapted to float upon water, an attachment fitting associated with the said aircraft at a position below the waterline thereof, a second attachment fitting associated with the handling gear for alignment adjacent said first fitting, and a translatable member associated with said handling gear having an operating portion extending above the said waterline whereby substantially vertical movements of the member selectively cause attachment and detachment of the said aligned fittings.

4. In a detachable handling gear for an aircraft adapted to float upon water, an attachment fitting associated with the said aircraft at a position below the waterline thereof, a second attachment fitting associated with the handling gear adapted for alignment adjacent said first fitting, a translatable member associated with said handling gear having an operating portion disposed above the said waterline for selective attachment and detachment of the said aligned fittings upon substantially vertical movements of said member, and automatic means to limit the translatory movement of the said member and hold the same in the attached and detached relationships of the said aligned fittings.

5. In a detachable handling gear for an aircraft adapted to float upon water, an apertured fitting attached to the said aircraft below the waterline thereof, an apertured fitting associated with the said gear, cooperating means associated with the said aircraft and gear, disposed above the waterline, adapted to facilitate alignment of the said apertured fittings, and a pin member having a handle portion extending above the waterline whereby its lower portion may be inserted within the apertures of the said aligned fittings.

6. In a detachable handling gear for aircraft, a female socket fitting disposed within a body portion of the said aircraft, a recess in the said fitting having an arcuate upper portion, parallel opposed side portions and a downwardly and outwardly sloping bottom portion, a male fitting having an arcuate nose adapted to engage said recess upper portion, cooperating locking members on said gear and aircraft body spaced from the said fittings, parallel opposed side faces on the said fitting nose adapted to slidingly engage the said side and bottom recess portions whereby the said gear may be rotated from a horizontal inoperative position to a vertical operative position in which the said locking members are aligned and engaged.

7. An aircraft adapted to float upon water, having a normal waterline, a detachable handling gear adapted to support the aircraft upon land and determining a normal ground line with respect thereto, the said water and ground lines comprising separate non-parallel planes, the said gear consisting of a strut member adapted to have its upper portion attached to the said aircraft with its axis normal to the waterline while the aircraft is afloat, at least one ground engaging wheel rotatably and swivelly mounted upon the lower portion of the said strut member, the upper and lower portions of the said strut member having their axes intersecting intermediate their ends whereby the axis of the said lower portion is maintained normal to the ground line to facilitate swivelling thereupon by the said wheel when the aircraft is aground.

8. In aircraft adapted to float upon water, a detachable handling gear for support of the aircraft on land, post and socket means for engagement of said gear with the aircraft limiting relative movement of the post means with respect thereto to partial rotation within a transverse vertical plane when said aircraft is afloat, and locking means disposed below the waterline but manually operable from above the same to prevent said rotation while the gear is in its supporting attitude.

9. In aircraft adapted to float upon water, a handling gear having swivelling and rotating wheels for support of the aircraft on land, means for detachably connecting said gear to the aircraft and limiting relative movement with respect thereto to rotation within a transverse vertical plane when said aircraft is afloat, and manually operable means disposed below the normal waterline of the aircraft but operable from above the same to prevent said rotation while the gear is in its supporting attitude, and means to insure free swivelling and rotation of said wheels while the aircraft is supported by the said gear upon a ground plane divergent from said waterline.

10. In aircraft adapted for support upon both land and water, a handling gear comprising a member having load-carrying means at its upper terminal and swivelling ground-engaging means at its lower terminal, latching means associated with an intermediate portion of said member for attachment of the gear to the aircraft, guide means associated with the aircraft adapted to engage the said load-carrying means and maintain the gear within a substantially vertical plane with respect to the water while the aircraft is afloat whereby engagement of the said latching means with the aircraft is facilitated, said member having the axis of its lower portion offset whereby it is maintained vertical with respect to the ground to facilitate the swivelling of the ground-engaging means while the aircraft is supported by the gear upon land.

11. The method of beaching a flying boat provided with a detachable beaching gear having a normally buoyant pneumatic tire, the hull of said flying boat having gear attachment means disposed both above and below the waterline, comprising the injection of a predetermined amount of liquid into the interior of said tire and the injection of air under pressure into the tire interior, whereby the buoyancy of the beaching gear is substantially reduced, the attachment of the gear to the above-water means in the floating attitude of the hull, the submergence of the reduced buoyancy tire portion of the gear, the attachment of an intermediate portion of the gear to the said under-water means, and movement of the flying boat to a position in which it is supported upon said tire.

ISAAC M. LADDON.